UNITED STATES PATENT OFFICE.

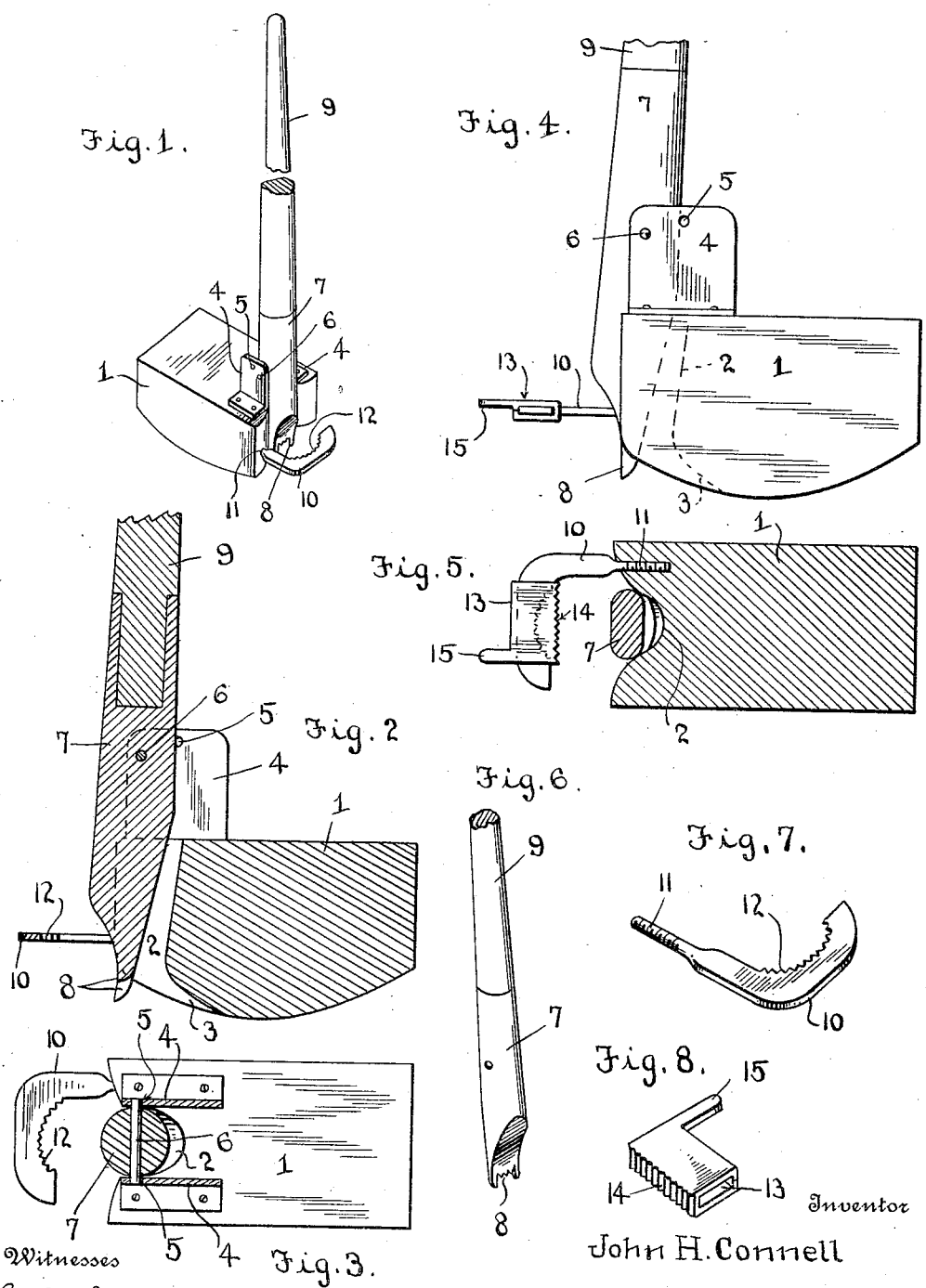

JOHN H. CONNELL, OF CHARLESTON, WEST VIRGINIA.

GRUBBING IMPLEMENT.

1,084,133.  Specification of Letters Patent.  Patented Jan. 13, 1914.

Application filed June 5, 1913.  Serial No. 771,994.

*To all whom it may concern:*

Be it known that I, JOHN H. CONNELL, a citizen of the United States, residing at Charleston, in the county of Kanawha and State of West Virginia, have invented certain new and useful Improvements in Grubbing Implements; and I do declare the following to be a full, clear, and exact description of the invention, such as will enable others skilled in the art to which it appertains to make and use the same.

This invention relates to improvements in grubbing implements.

One object of the invention is to provide a grubbing implement having an improved construction and arrangement of grub or underbrush and weed gripping mechanism by means of which very large or small grubs or weeds may be firmly gripped close to the ground and pulled up without breaking the stalks from the roots.

Another object is to provide a grubbing implement having an improved construction and arrangement of lever and fulcrum block by means of which very large and deeply rooted grubs or small trees may be readily pulled up.

A further object is to provide a grubbing implement which will be simple, strong, durable and inexpensive in construction, efficient and reliable in operation and well adapted to the purpose for which it is designed.

With these and other objects in view, the invention consists of certain novel features of construction, and the combination and arrangement of parts as will be more fully described and claimed.

In the accompanying drawings: Figure 1 is a perspective view of my improved grubbing implement; Fig. 2 is a central vertical longitudinal section thereof; Fig. 3 is a horizontal section of the implement taken through the pivotal connection of the lever socket; Fig. 4 is a side view of the implement showing the same arranged for pulling small underbrush or weeds; Fig. 5 is a horizontal sectional view of the implement arranged as shown in Fig. 4 and taken through the fulcrum block and lower end of the lever socket; Fig. 6 is a perspective view of the lever socket and lever; Fig. 7 is a similar view of the stationary gripping jaw of the implement; Fig. 8 is a similar view of the supplemental or removable gripping jaw for use in pulling small underbrush or weeds.

My improved gripping implement comprises a fulcrum block 1 which is preferably constructed of wood but which may be formed of any suitable material and any desired size. The block 1 is rounded or curved on its lower side to permit the same to have a rocking engagement with the ground, while the implement is being used for pulling up underbrush or weeds. In the front end of the fulcrum block 1 is a vertically disposed recess 2 which is substantially semi-circular and has its rear wall inclined rearwardly from the lower toward the upper side of the block as shown. In the bottom of the block and lower edge of the recess 2 is formed a V-shaped notch 3 the purpose of which will be hereinafter described.

Secured to the upper side of the block near the forward end thereof and on opposite sides of the recess 2 are upwardly projecting bearing plates 4 in which are formed two or more alined bearing apertures 5 which are adapted to receive the bearing pin or bolt 6 of a pulling lever comprising a metal socket 7 which is disposed between the bearing plates 4 and is pivotally mounted on the pin or bolt 6. The body of the socket 7 is preferably cylindrical while the solid lower end thereof is flattened on its upper and lower sides and tapers toward its lower end. On the tapered lower end of the socket is formed a series of gripping teeth 8, said solid toothed end of the socket thus forming the movable gripping jaw of the implement. Adapted to be engaged with the open upper end of the socket is the handle 9 of the lever, said handle being preferably formed of wood and of such length as to afford sufficient leverage for pulling large underbrush or small trees Secured in one side of the forward end of the fulcrum block 1 near the bottom thereof is the stationary gripping jaw 10 of the device, said jaw being preferably in the form of a hook, the shank 11 of which is preferably threaded and screwed into the block as shown. The inner edge of the hook shaped end of the jaw is preferably serrated or provided with teeth 12 which co-act with the teeth 8 of the gripping jaw on the lower end of the lever socket and thus permits the jaws to obtain a firm grip on the underbrush or weeds with which it is engaged. The arrangement of the stationary and movable gripping jaws of the implement enables the implement to grip the grub or weed close to the surface of the ground or immediately above the roots, so that the grub or weed is extracted without breaking the stalk from the roots.

The toothed edge of the jaw 10 is curved and the lower end of the lever socket or movable jaw of the implement is spaced a sufficient distance from the toothed edge of the stationary jaw when the lever is swung upwardly to permit the engagement of the implement with the body or trunks of trees or underbrush of quite large size and preferably as large as three inches in diameter. In order to permit the implement to be employed for pulling very small weeds and brush, I provide means for facilitating the engagement of the jaws of the implement therewith, said means comprising a supplemental stationary gripping jaw 13 comprising a flat open tube or sleeve of spring metal which is adapted to be slipped or forced onto the hook shaped outer end of the stationary jaw member 10 and which is provided on its inner edge with a series of teeth or notches 14 which are adapted to co-act with the teeth 8 of the jaw member on the lever socket and which, owing to the straight inner edge of the supplemental jaw member, the straight row of teeth arranged thereon will form a close contact or engagement with the toothed end of the jaw of the socket, thus enabling these parts to obtain a firm hold on the stalks or stems of very small plants. The supplemental jaw member 13 is preferably provided on one end with a handle 15 whereby the same may be readily engaged with and removed from the hook-shaped outer end of the stationary jaw member 10 as will be readily understood. Any suitable means may be employed for holding the supplemental or movable jaw member 13 in engagement with the stationary jaw member 10 or as herein shown, said supplemental jaw member may be held in operative position by the spring action or frictional engagement of its sides with the stationary jaw member 10. By providing the notch 3 in the lower end of the recess 2 in the fulcrum block, dirt or foreign matter will be prevented from accumulating in the lower end of the recess 2 and thus interfering with the upward movement of the outer end of the lever and the rearward movement of the jaw thereof.

In the operation of the device the forward end of the fulcrum block is placed adjacent to the grub, brush or weed to be pulled and the gripping jaws engaged therewith close to the ground after which the lever is operated to cause the jaw member thereon to tightly grip the brush or weed between the same and the stationary jaw so that when any further pressure is applied to the handle end of the lever the fulcrum block will rock and thus permit the lever to pull the brush or weed out of the ground without breaking the stalk from the root and with a minimum amount of labor or exertion on the part of the operator. In this operation, the stalk of the brush or weed falls into the recess 2 and even into the notch 3 if the block be rocked to a considerable extent as will be necessary if the root of the weed is long, and therefore no sharp corner of the block strikes the stalk or root of the weed and the latter is not broken. Where the weeds being pulled are rather small, the fixed jaw will be adjusted toward the block by screwing it farther inward or by withdrawing it entirely and replacing it with another hook-shaped member whereof the bill is closer to the block or closer to the movable jaw, but these details will not need illustration.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described my invention, what I claim is:

1. In a grubbing implement of the character described, a fulcrum block having a rounded lower surface and in its forward end an upright recess inclining backward at its upper end, the rear wall of said recess at its lower end being notched and the notch running out in the rounded lower surface of the block, a lever pivoted to the top of the block and lying within said recess, a movable jaw at the lower end of the lever, and a fixed jaw of hook-shape carried by the front end of the block with its bill overlying the face of the movable jaw.

2. In a grubbing implement of the character described, a fulcrum block having a rounded lower surface and having in its forward end a recess in the lower end of which is formed a notch, a stationary jaw secured in said block, bearing plates secured to said fulcrum block and having therein bearing apertures, a socket adjustably pivoted between said bearing plates and having its lower end tapered and provided with a series of teeth to form a movable gripping jaw, and a handle engaged with the upper end of said socket.

3. In a grubbing implement, a fulcrum block, a hook-shaped member carried by said block, a pulling lever fulcrumed on said block, a movable jaw on the lower end of said lever, and another jaw having a removable engagement with said member and adapted to coact with the movable jaw on said lever for pulling very small underbrush, weeds and the like.

4. In a grubbing implement, a fulcrum block, a stationary hook carried by said block, a pulling lever fulcrumed on said block, a movable jaw on the lower end of said lever, and another supplemental jaw comprising a tube or sleeve adapted to be removably engaged with the bill of said hook, said sleeve having a straight toothed edge adapted to co-act with the movable jaw for gripping very small brush, weeds and the like, and a handle on this jaw to facilitate the engagement thereof with and its removal from said hook.

In testimony whereof I have hereunto set my hand in presence of two subscribing witnesses.

JOHN H. CONNELL.

Witnesses:
JAMES A. RUFFNER,
LOUISE J. ROBINSON.

---

Copies of this patent may be obtained for five cents each, by addressing the "Commissioner of Patents, Washington, D. C."